UNITED STATES PATENT OFFICE.

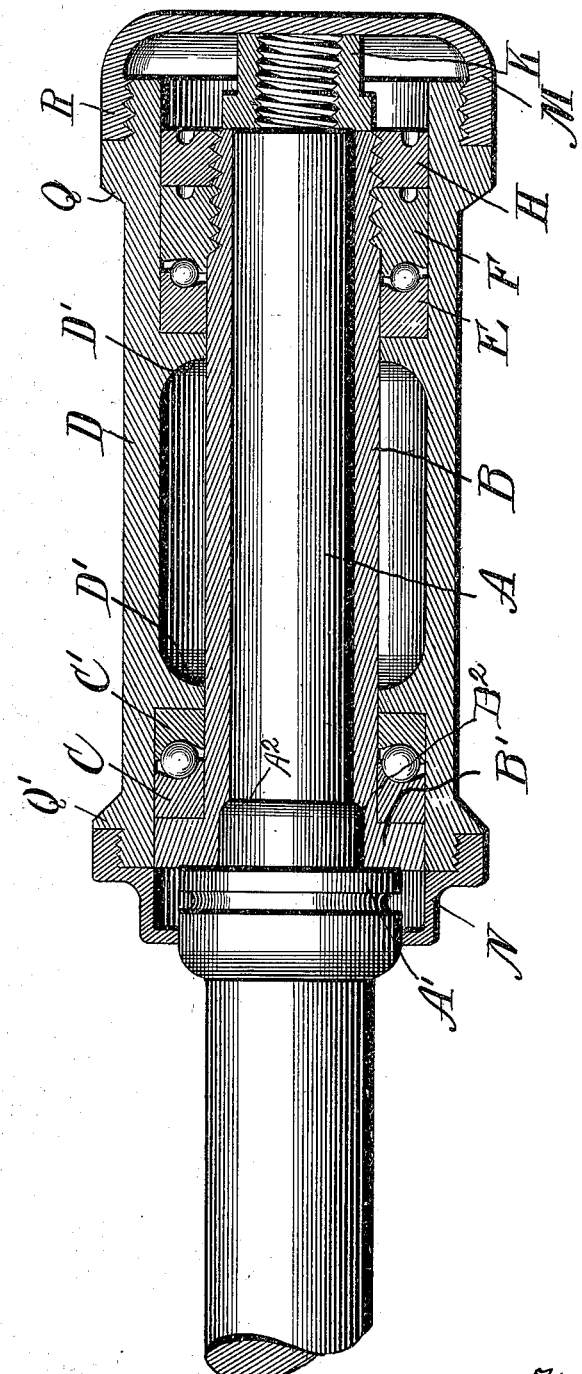

HARLEY COGSWELL, OF LAKEVIEW, MICHIGAN.

BALL-BEARING.

SPECIFICATION forming part of Letters Patent No. 709,206, dated September 16, 1902.

Application filed October 9, 1901. Serial No. 78,114. (No model.)

*To all whom it may concern:*

Be it known that I, HARLEY COGSWELL, a citizen of the United States, residing at Lakeview, in the county of Montcalm and State of Michigan, have invented certain new and useful Improvements in Ball-Bearings; and I do hereby declare the following to be a full, clear, and exact description of the invention, such as will enable others skilled in the art to which it appertains to make and use the same.

This invention relates to new and useful improvements in ball-bearings for vehicle wheels, shafts, &c.; and it consists in the provision of a shouldered sleeve which is detachably mounted on a shouldered spindle, suitable bearing-rings being mounted about the sleeve and between same and the hub, and means for holding the sleeve in place upon the spindle and mechanism for adjusting the bearings.

The invention consists, further, in the provision of various features, combinations, and arrangements of parts, as will be hereinafter more fully described, and then specifically defined in the appended claim.

I clearly illustrate the invention in the accompanying drawing, which, with the letters of reference marked thereon, forms a part of this application, and in which drawing the figure is a central longitudinal sectional view through the improved bearing shown as applied to the axle of a vehicle.

Reference now being had to the details of the drawing by letter, A designates the axle of the vehicle, said axle having a shoulder A' and its contracted end threaded to receive the nut or bur K. Telescoping over the axle is a sleeve B, with its inner end flanged, as at B'. The shoulder A' on the axle is adapted to contact with the flange B' of the sleeve, and a second shoulder $A^2$, which is convexed and forming a part of the axle, is designed to bear against a concaved shoulder $B^2$ in the wall of the bore of the sleeve, said shoulders and flange coöperating to limit the inner movement of the sleeve.

The ball-bearing ring C is mounted about the sleeve and normally rests against the shoulder B' when adjusted in place. A second bearing-ring C', which coöperates with the ring C to retain the inner series of antifriction-balls, is held in position by means of an annular shoulder D' on the inner surface of the cylindrical hub D. A similar annular shoulder serves to retain the bearing-ring E in place, and between said ring E and ring F the outer series of balls are held. Said ring F has interior threads which engage the exterior threads on the sleeve, and by means of this ring F the bearing-rings may be adjusted. A jam-nut H is fitted over the threaded portion of the sleeve and is designed to hold the ring F in place. The outer end of the hub has an annular shoulder Q, adjacent to which is a threaded portion R, over which the dust-cap M fits. The inner end of the hub has a similar shoulder Q', against which the inner end of the dust ring or guard N abuts, said guard N having an inturned flange which is held adjacent to the shoulder of the axle to prevent dust or water entering the bearing parts.

Having thus described my invention, what I claim to be new, and desire to secure by Letters Patent, is—

A ball-bearing for vehicles, comprising an axle having a shoulder A' and a convexed shoulder $A^2$ adjacent thereto, combined with a sleeve B having a flanged end and a concaved shoulder $B^2$ in the wall of its bore adjacent to said flange, said flange and concaved shoulder designed to contact with the shoulders A' and $B^2$ respectively, a hub having annular flanges D' which are flat on their outer faces, bearing-rings C and C' about said sleeve and interposed between one of said flanges D' and flange B', the bearing-ring E in contact with the outer of said flanges D', a bearing-ring F having its bore threaded a portion of its length and engaging the threads about the outer portion of the axle, the inner face of said bearing-ring F having a concaved bearing-shoulder, balls interposed between said bearing-rings, a threaded ring H also fitted on the threaded circumference of the axle and abutting against the outer face of said ring F, the inner end of the hub extending over said rings C C' and flange B', and dust-caps N and M with interiorly-threaded flanges fitted over threaded portions of the circumference of the hub at the ends thereof and abutting against shoulders thereon, as set forth.

In testimony whereof I affix my signature in presence of two witnesses.

HARLEY COGSWELL.

Witnesses:
GEORGE BUNKER,
CLAUD E. WHITE.